(12) United States Patent
Kithil et al.

(10) Patent No.: US 6,275,146 B1
(45) Date of Patent: Aug. 14, 2001

(54) VEHICLE OCCUPANT SENSING

(76) Inventors: Philip W. Kithil, 1274 Vallencito Dr., Santa Fe, NM (US) 87501; Michael H. Barron, 281 E. Rodeo Rd., Santa Fe, NM (US) 87505; William C. McIntosh, 1109 Caminito Alegre, Santa Fe, NM (US) 87501

( * ) Notice: Subject to any disclaimer, the term of this patent is extended or adjusted under 35 U.S.C. 154(b) by 0 days.

(21) Appl. No.: 09/155,373
(22) PCT Filed: Apr. 23, 1997
(86) PCT No.: PCT/US97/06822
 § 371 Date: Jun. 14, 1999
 § 102(e) Date: Jun. 14, 1999
(87) PCT Pub. No.: WO97/39920
 PCT Pub. Date: Oct. 30, 1997

Related U.S. Application Data (60) Provisional application No. 60/016,374, filed on Apr. 23, 1996, provisional application No. 60/016,375, filed on Apr. 23, 1996, provisional application No. 60/017,440, filed on May 17, 1996, provisional application No. 60/022,774, filed on Jul. 30, 1996, provisional application No. 60/024,027, filed on Aug. 16, 1996, provisional application No. 60/028,358, filed on Oct. 11, 1996, provisional application No. 60/032,265, filed on Dec. 3, 1996, and provisional application No. 60/037,701, filed on Feb. 10, 1997.

(51) Int. Cl.$^7$ ............................................... B60Q 1/00
(52) U.S. Cl. ..................... 340/425.5; 340/436; 340/438; 340/439; 180/272; 280/735; 701/45
(58) Field of Search ................... 340/425.5, 436, 340/438, 439; 280/728.1, 735; 180/271, 272; 701/45, 46

(56) References Cited

U.S. PATENT DOCUMENTS 3,740,567   6/1973   Atkins .
4,625,329   11/1986  Ishikawa et al. .
4,796,013   1/1989   Yasuda et al. .
4,908,574   3/1990   Rhoades et al. .
4,972,154   11/1990  Bechtel et al. .
4,980,519   12/1990  Mathews .
5,071,160   12/1991  White et al. .
5,074,583   12/1991  Fujita et al. .
5,118,134   6/1992   Mattes et al. .
5,161,820   11/1992  Vollmer .
5,166,679   11/1992  Vranish et al. .
5,214,388   5/1993   Vranish et al. .
5,232,243   8/1993   Blackburn et al. .
5,247,261   9/1993   Gershenfeld .
5,261,506   11/1993  Jost .
5,291,014   3/1994   Brede et al. .
5,330,226   7/1994   Gentry et al. .
5,362,051   11/1994  Swafford, Jr. et al. .
5,366,241   11/1994  Kithil .
5,394,097   2/1995   Bechtel et al. .
5,398,185   3/1995   Omura .
5,400,487   3/1995   Gioutsos et al. .
5,404,128   4/1995   Ogino et al. .
5,431,438   7/1995   Manabe .
5,439,249   8/1995   Steffens, Jr. et al. .

(List continued on next page.)

OTHER PUBLICATIONS

Baxter, Larry, "Capacitive Sensors, Design and Applications", IEEE Press Series on Electronics Technology, pp. 22–23, 44–45, 68–71, and 74–75.

Touch Sensor Technologies, "Human Touch Sensor", touchsensor.com, Jan., 1999.

Primary Examiner—Edward Lefkowitz
(74) Attorney, Agent, or Firm—Jeffrey D. Myers (57) ABSTRACT

A capacitive sensor (5) and systems based thereon, preferably for vehicle occupant position sensing, such systems preferably comprising arrays of such sensors wherein each sensor comprises dual adjacent planar electrodes.

10 Claims, 5 Drawing Sheets

U.S. PATENT DOCUMENTS

| | | |
|---|---|---|
| 5,446,661 | 8/1995 | Gioutsos et al. . |
| 5,482,314 | 1/1996 | Corrado et al. . |
| 5,494,311 | 2/1996 | Blackburn et al. . |
| 5,512,836 | 4/1996 | Chen et al. . |
| 5,525,843 | 6/1996 | Höwing . |
| 5,540,459 | 7/1996 | Daniel . |
| 5,549,323 | 8/1996 | Davis . |
| 5,551,288 | 9/1996 | Geraldi et al. . |
| 5,602,734 | 2/1997 | Kithil . |
| 5,653,462 | 8/1997 | Breed et al. . |
| 5,702,123 | 12/1997 | Takahashi et al. . |
| 5,707,077 | 1/1998 | Yokota et al. . |
| 5,712,784 | 1/1998 | Fendt et al. . |
| 5,722,686 | 3/1998 | Blackburn et al. . |
| 5,742,916 | 4/1998 | Bischoff . |
| 5,770,997 | 6/1998 | Kleinberg . |
| 5,785,347 | 7/1998 | Adolph et al. . |
| 5,802,479 | 9/1998 | Kithil et al. . |
| 5,829,782 | 11/1998 | Breed et al. . |
| 5,844,486 | 12/1998 | Kithil et al. . |
| 5,848,802 | 12/1998 | Breed et al. . |
| 5,861,681 | 1/1999 | Nakano et al. . |
| 5,871,232 | 2/1999 | White . |
| 5,914,610 | 6/1999 | Gershenfeld et al. . |

VEHICLE OCCUPANT SENSING

CROSS-REFERENCE TO RELATED APPLICATIONS

This application claims priority to the following applications: U.S. patent application Ser. No. 08/778,871 entitled Integral Capacitive Sensor Array, to Philip W. Kithil, et al., filed on Jan. 2, 1997; U.S. Provisional Patent Application Ser. No. 60/016,374 entitled Occupant Detecting System, to Philip W. Kithil filed on Apr. 23, 1996; U.S. Provisional Patent Application Ser. No. 60/016,375 entitled Wheelchair Motion-Activating System for Seriously Disabled Persons, to Philip W. Kithil filed on Apr. 23, 1996; U.S. Provisional Patent Application Ser. No. 60//017,440 entitled Head Position Detection and Recording System, to Philip W. Kithil filed on May 17, 1996; U.S. Provisional Patent Application Ser. No. 60/022,774 entitled Safety System Enabling, Adjusting, Disabling or Activating Sensors and Snooze Alarm, to Philip W. Kithil filed on Jul. 30, 1996; U.S. Provisional Patent Application Ser. No. 60/024,027 entitled Capacitive Zoning System for Adult and Child Discrimination in a Vehicle, to Philip W. Kithil, et al., filed on Aug. 16, 1996; U.S. Provisional Patent Application Ser. No. 60/028,358 entitled Low Cost Capacitive Sensor Array, to Philip W. Kithil, et al., filed on Oct. 11, 1996; U.S. Provisional Patent Application Ser. No. 60/032,265 entitled Noncontacting Switch Responsive to Human Body Proximity or Motion, to Philip W. Kithil filed on Dec. 3, 1996; and U.S. Provisional Patent Application Ser. No. 60/037,701 entitled Headliner Circular Electrodes and Hemispheric Sensing, to Philip W. Kithil filed on Feb. 10, 1997.

BACKGROUND OF THE INVENTION

1. Field of the Invention (Technical Field)

The present invention relates to vehicle occupant sensing methods and apparatuses.

2. Background Art

Detection of occupants in a vehicle is necessary for improved performance of safety systems, as well as for activation of comfort and convenience systems. Sensor technologies known in the art include beam-emitting devices such as infrared, ultrasound, microwave, and capacitance-based sensors, the latter being able to fill a volume and respond to the different conductivity of the occupant versus that of air and surrounding materials. These sensor technologies are usefully employed, in various embodiments in various locations in a vehicle. The present invention is of novel configurations providing a plethora of advantages over known systems, as described below.

SUMMARY OF THE INVENTION (DISCLOSURE OF THE INVENTION)

The present invention is of a capacitive sensor array comprising a plurality of capacitive sensors, each of the sensors comprising two adjacent electrodes formed on a single surface of a dielectric substrate. In the preferred embodiment, each capacitive sensor is installed in a seat, floor, door panel, dashboard, roof, roof supports, or steering wheel of a vehicle to sense occupant presence or position.

The invention is further of a signal device for a vehicle airbag system or other safety device, the device comprising a voltage threshold, the threshold selected from a range of output voltages created by a capacitive sensor constructed of dual adjacent electrodes formed on a single surface of a dielectric substrate, the range of voltages comprising a continuum from a maximum voltage when sensing fields are undisturbed by proximity of a person to a minimum voltage when a person is adjacent to the capacitive sensor.

The invention is additionally of a capacitive sensor array comprising a plurality of capacitive sensors with dual adjacent electrodes formed on a single surface of a dielectric substrate, the array installed in a vehicle in a manner to detect a vehicle occupant's head position relative to a seat headrest, and the array connected to adjustment means for adjusting seat headrest position to achieve a desired proximity of the headrest to the occupant's head.

The invention is also of a device for determining head position of a vehicle occupant by reference to proximity values obtained from an array of three or more proximity sensors, the device employing a geometric relationship of the sensors and the occupant's head, the device optionally employing an adjustment of the proximity values to adjust for a difference between a head surface proximity point and a head interior point, the device optionally being used to detect occupant impairment, to detect relative risk to the occupant caused by occupant's possibly dangerous position, or to enable the occupant to perform tasks by undertaking predetermined movements of the head.

The invention is still further of a device for detecting vehicle operator impairment, the device comprising means for determining phase shifts of vehicle motion and operator head motion.

The invention is additionally of a vehicle occupant sensing system employing one or more capacitive sensors and one or more weight sensors, the one or more capacitive sensors comprising dual adjacent electrodes formed on a surface of a dielectric substrate, and optionally wherein the capacitive sensors is positioned in a roof, dashboard and/or seat, and optionally wherein the weight sensor is positioned in a seat.

The invention is also of a vehicle airbag system comprising an occupant sensing system and an airbag inflation means, the occupant sensing system comprising one or more capacitive sensors positioned adjacent a roof, and optionally comprising means to detect occupant weight, the airbag inflation means becoming armed upon the capacitive sensors outputting a signal indicating presence of an occupant and receiving a signal from the weight sensing means indicating presence of an occupant.

The invention is further of a capacitive sensor comprising a plurality of electrodes formed on a single surface of a dielectric substrate, the electrodes being separated by grounded areas, the substrate additionally comprising a grounded area on an opposite surface from the electrodes, the opposite-side grounded area electrically connected to grounded areas which separate the electrodes. In the preferred embodiment, the substrate encompasses all or a portion of at least two adjacent sides of a rectangle.

The invention is yet further of a capacitive sensor comprising at least two adjacent electrodes formed on a single surface of a dielectric material and electronic parts electrically connected to the electrodes, wherein the electronic parts are installed on an opposite surface of the dielectric material or on a separate dielectric material which is adhered to the capacitive sensor dielectric material.

Primary objects of the present invention are to provide for enhanced safety and operability of automated systems within passenger vehicles.

A primary advantage of the present invention is it ability to provide the above objects in a cost effective manner.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Detection of occupants in a vehicle is necessary for improved performance of safety systems, as well as for activation of comfort and convenience systems. Sensor technologies known in the art include beam-emitting devices such as infrared, ultrasound, microwave, and capacitance-based sensors which fill a volume and respond to the different conductivity of the occupant versus that of air and surrounding materials. These sensor technologies may be employed in various novel embodiments, as discussed below, in the seat, floor, door, dashboard, roof, roof supports ("A" pillar, "B" pillar, etc) or steering wheel.

Of the capacitance sensors preferably employed in this application, at least five variations are known, all of which respond to the interference of the capacitive fields by the presence of a person. The capacitance sensor may consist of:

dual opposing electrodes with electric fields in between;

one electrode which capacitively couples to the metal skin of the vehicle;

one electrode against a driven backplane which capacitively couples to the person who is grounded to the vehicle.

dual, non-opposing electrodes which are spatially separated in either a planar or nonplanar fashion; or, most preferably dual adjacent planar electrodes.

This last capacitive sensor is believed to be advantageous because the sensing field is controlled and less subject to stray interference or parasitic capacitances created by other objects in the vehicle. Also, this sensor can be employed in arrays such that the sensing fields overlap in a fashion to completely fill the desired sensing volume. Such a sensor can be placed in an array in the roof of a vehicle as shown in applicant's U.S. Pat. No. 5,602,734 and related applications, can be employed individually in the designated locations, or can utilize multiple locations in any desirable combination, such as: door, seat bottom, and seat back; dashboard, door, and seat back; seat bottom and seat back; and the like. In each application, the sensor fields extend inward from the plane of the capacitive sensor, toward the occupant's position in the vehicle.

Figure 1:
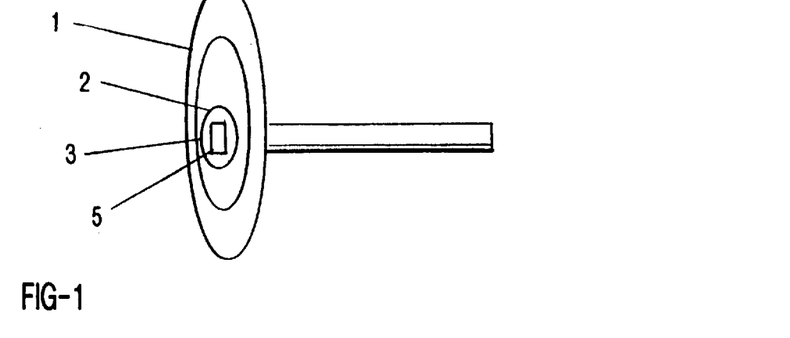
FIG. 1 is a schematic of the adjacent electrode capacitive sensor of the invention in a steering wheel airbag cover.
Figure 2:
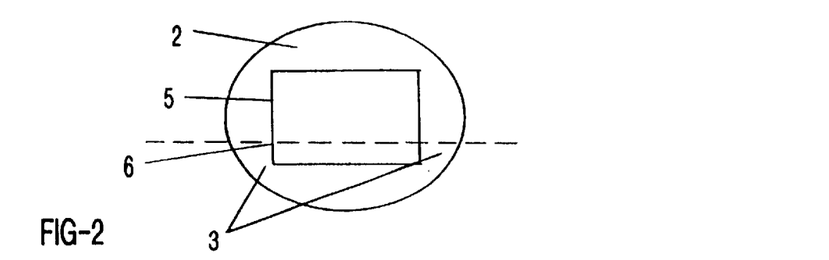
FIG. 2 is a back and side view of a capacitive sensor of the invention with a tear seam and electronic parts on a side facing the occupant.

First referring to FIGS. 1, 2(a), and 2(b), a single sensor 5 installed on the inner surface of the steering wheel 1 airbag cover 2 can switch the output of the airbag system according to the proximity of the human body. If a driver's hand, arm, or body (not shown) is close to or touching the airbag cover 2, the airbag inflator (not shown) is switched to a low output mode, thereby reducing injuries caused by the initial burst-through of the rapidly inflating airbag 4. For this application, the sensor 5 may require a perforated tear seam 6 across its midpoint so the airbag 4, which is underneath the sensor 5, can burst through the airbag cover tear seam 3 without propelling the sensor 5 through the airbag cover 2. By locating the electronic parts 8 on the side of the sensor 5 facing the driver and removed from the perforated tear seam 6, the rapid airbag deployment will not detach the parts 8 and cause them to fly into the face of the driver.

Figure 3:
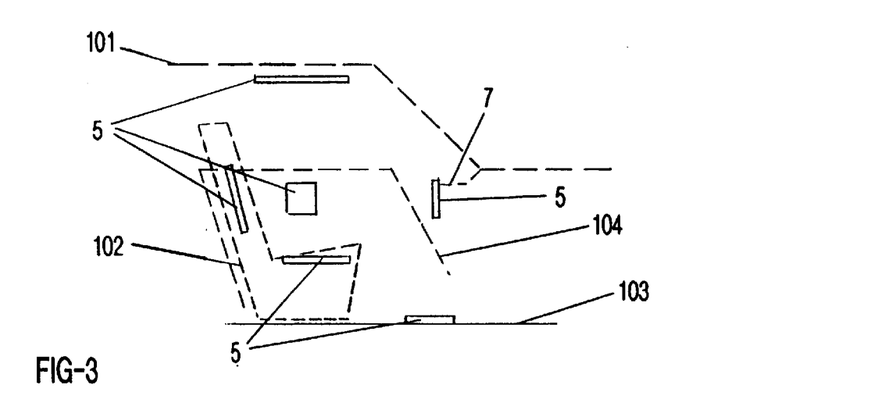
FIG. 3 is a schematic of alternate capacitive sensor locations of the invention on the passenger side of a vehicle.

Referring to FIG. 3, in a vehicle airbag system (not shown) for the passenger, the sensor 5 can be installed on the dashboard 7 facing the seat occupant. If the occupant is not within the sensing fields, the airbag system (not shown) is activated. However, if the occupant moves into a position close to the airbag door (not shown), the system is either deactivated or is activated at a reduced inflation level.

Alternatively, two or more sensors 5 are employed, one on the face of the dashboard 7 in front of the passenger seat 102, and one or more sensors 5 are installed in the roof 101 above the passenger seating position. The sensor 5 in the dashboard 7 determines if a person or a baby in a childseat (not shown), is nearby. Simultaneously the roof sensor(s) 5 determine if a normally seated person is present, by sensing the person's head (not shown). If both the roof sensor(s) and the dashboard sensor indicate proximity of a person, a logic operation determines the occupant is an adult whose knees or legs are close to the airbag, and normal airbag operation is enabled. If only the dashboard sensor indicates a person in proximity, the logic operation determines the person is an infant in a rear-facing child seat and the airbag is disabled.

In some vehicles, it may be desirable to incorporate adjacent electrode capacitive sensors 5 in the interior door 104 or in the floor 103, to accomplish occupant sensing.

The invention can further include analysis of change in voltage output from the roof and/or dashboard sensors to detect motion of the occupant caused either by normal human actions or by severe braking such as a panic stop. In the latter instance, the logic operation can determine approximate occupant position relative to the airbag door at the moment of impact, allowing optimum response by the airbag system.

Figure 4:
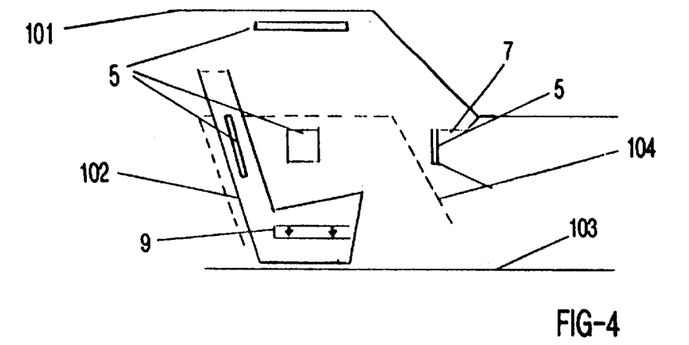
FIG. 4 is a schematic of capacitive sensors used in combination with weight sensors.

As depicted in FIG. 4, the invention may also be employed in combination with one or more other technologies. For example, the capacitive sensors 5 may be installed in the interior roof 101 and in the dashboard 7, together with a weight detecting device 9 located in the seat 102, to reliably discriminate adults, children, infants, and inanimate objects in the seat. This sensor configuration is better able to detect a small infant in a child seat which is positioned rear-facing on the front passenger seat, thereby disabling the airbag, or triggering a relatively small amount of inflation force.

Examples of the passenger detecting sensor thresholds and output conditions that may be derived by logic operations for this configuration are indicated in Table 1 (Y indicates a sensor response greater than the indicated threshold value).

TABLE 1

| Capacitive-Roof 50 millivolts | Capacitive-IP 100 millivolts | Seat Weight Sensor' 25 pounds | Condition |
|---|---|---|---|
| Y | Y | Y | Adult-knees close to Instr. Panel |
| Y | N | N | Rear seat occupant leaning over an empty front seating position |
| Y | N | Y | Normally seated adult or child (knees not close to Instr. Panel); large animal on seat; child standing on seat. |
| N | Y | Y | Infant in rear-facing child seat |
| N | N | Y | Heavy, inanimate object in the seat. |
| N | N | N | Empty seat or lightweight object in the seat. |
| N | Y | N | Empty seat with wet/metallic object draped over the instrument panel. |
| Y | Y | N | Child standing on front floor. |

The invention can employ additional capacitive coupling sensors in the roof, seat, IP, or door to offer even greater discrimination and reliability of detection, and of course the user can select yes/No thresholds that differ from those above to alter the capabilities of the system.

Optionally, the airbag system may employ the capacitive sensors 5 in the roof 101 as the primary occupant sensing system, in combination with a weight sensor 9 in the seat, as a backup/confirmation occupant sensing system. In this embodiment, the sensing system looks at occupant characteristics from two perspectives - capacitance and weight, in the roof and in the seat.

Figure 5:
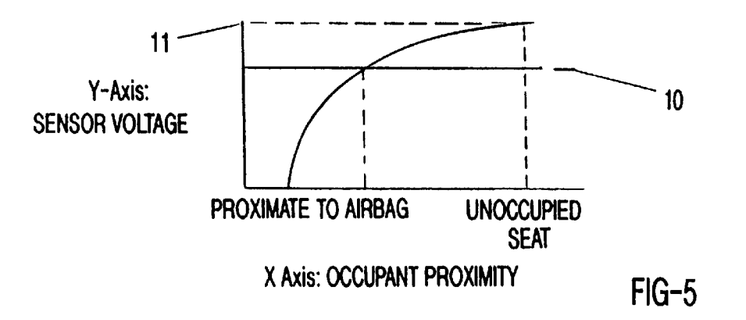
FIG. 5 is a plot of voltage response versus occupant proximity showing voltage thresholds employed by the invention.

Referring to FIG. 5, preferably the capacitive sensor voltage output of the invention, when no human body is present in the immediate vicinity, is a predetermined maximum voltage 11. The presence of a human body causes the voltage output to decrease. This decrease in voltage is detectable, and corresponds in a known manner to proximity of the human body. If the voltage decreases below a certain threshold 10, the safety system is enabled, disabled, and/or activated at an appropriate level of response. Alternatively, an array of several sensors with overlapping sensing fields can determine the precise position of the person, as previously disclosed in applicants'pending applications.

Figure 6:
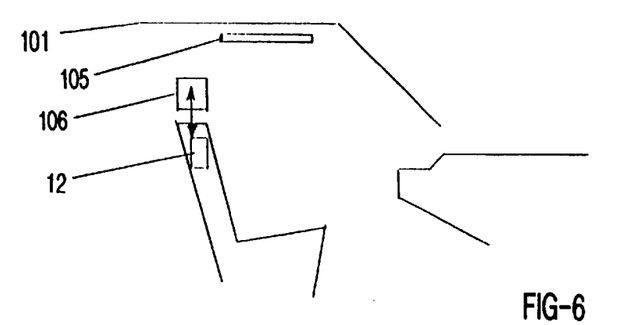
FIG. 6 is a schematic of an array of roof-mounted sensors of the invention connected to the seat headrest adjusting mechanism.

The capacitive sensor can also be employed to improve occupant protection in crashes which do not require airbag deployment such as rear-end impacts. As shown in FIG. 6, in a motor vehicle the seat is designed to absorb these crash forces, particularly in regard to minimizing whiplash by providing a headrest 106. Often this is manually adjustable to accommodate the full range of possible occupant heights. Unfortunately, many occupants forget to adjust the headrest height, and thus risk whiplash injury if a rear end impact occurs. By reference to output from an array of three or more capacitive sensors 105 in the roof which determine occupant head XYZ coordinates, the Z-coordinate can be fed to a headrest height adjusting mechanism 12, to accomplish automatic, continuous adjustment of height, to match the head height of the occupant.

The means of triangulating head position using proximity data from three roof-mounted capacitive coupling sensors can be achieved using either trigonometry or analytic geometry. The simplest, and therefore the fastest, solution is obtained using analytic geometry. This solution is simplified by placing the three sensors so that one side of the triangle thus formed parallel to the vehicle x-axis (direction of motion). The most advantageous triangle shapes are equilateral, or isosceles with the base parallel to the x-axis. These array spacings, in combination with x-axis orientation, reduce the computational requirements for head position triangulation, increase the algorithm throughput, and reduce cost.

With a sensor installed in the headliner above a seating position, sensor output voltage varies as a function of the distance from the sensor to an occupant's head (the "target"). The change in the sensor output voltage with respect to target proximity is a nonlinear response, best fit by an exponential capacitance charge function of the form:

$$\text{volts} = A + B \times \exp(C \times \text{proximity})$$

Figure 13:
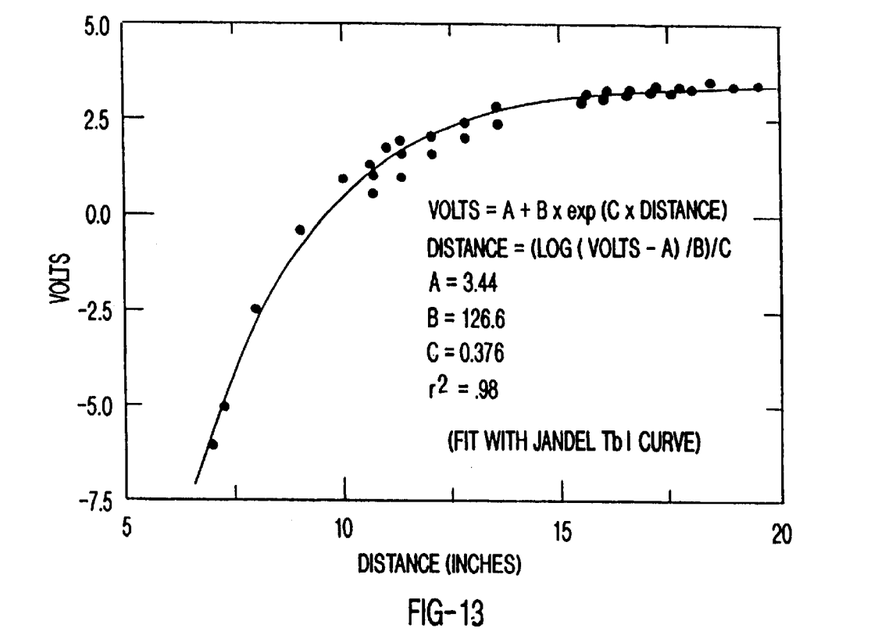
FIG. 13 is a plot of a typical response curve for a sensor of the invention.

FIG. 13 shows a typical response curve for one of the sensors. The plot is a fit to data samples taken both orthogonal to the sensor and at two lateral offsets of about 10 inches. The vertical spread of samples at specific distances is a rough measure of the slight distortion of the sensor field from a perfectly hemispherical shape towards one that has a teardrop shape. Note that sensor output voltage increases as range to target increases, leveling off at a maximum value— the limiting range. The constants for the curve in FIG. 13 are typical for the 6 to 8 inch diameter sensors currently in use. An intuitive feel for the transform function can be developed by looking at the exponential term with C=−0.5. The result quickly goes to near-zero magnitude with increasing distance:

$$\exp(-0.5 \times 1.00 \text{ inch}) = 0.606$$

$$\exp(-0.5 \times 2.00 \text{ inch}) = 0.368$$

$$\exp(-0.5 \times 5.00 \text{ inch}) = 0.082$$

$$\exp(-0.5 \times 10.0 \text{ inch}) = 0.007$$

As the exponential term approaches zero, the result of multiplying by B also approaches zero, and therefore the function volts=A+B×exp(C×proximity) approaches A. Thus A is the "empty field" voltage limit. In general, A is set when the sensor electronics are calibrated, B is a function of the signal processing gain, and C is a function of sensor geometry and the capacitative environment of the installation. In common usage of this function, constants A, B and C are the offset, gain, and decay, respectively.

The invention permits using single sensors or a pair of sensors, and in these situations voltage thresholds can be used to create presence-absence signals or "zoned" outputs. In these cases the threshold(s) can be set experimentally and the transform functions for the sensors (the three constants) do not need to be known and are not used except during system design.

Sensors of the invention are preferably used to triangulate head position for use by air bag deployment logic and to address the problem of the detection of "drowsy drivers". In order to triangulate, the sensor voltages are digitized and the inverse transform function is applied to obtain a range-to-target value (proximity) for each of the (preferably) three sensors.

$$\text{proximity} = \log_e((\text{volts}-A)/B)/C$$

A CPU or like controller is used to digitize the sensor voltages, apply the transform function, and perform a triangulation process. One implementation of the process is a "brute force" trigonometric solution, which is not reproduced here because there are simpler solutions.

A problem exists related to the use of more than three sensors. An array of four or five sensors may be sampled and the "hottest" three selected—the three closest to the target. The triangulation is then applied using the three selected sensors. As the target moves from below one set of three sensors to below another set, a small "glitch" in the resultant XYZ position appears. This is due to the fact that one set of three sensors has a different transform function error component than another set (error in calibration of the three constants.) Since one of the key interests is to use small position changes to detect driver impairment, change relative position is much more important than absolute position. Therefore, for triangulation a fixed set of three sensors is preferably employed.

The system architecture preferably incorporates an imbedded controller to perform the triangulation and the cost of this controller may be minimized by eliminating or minimizing the need for the trigonometric functions and other advanced mathematical operators. One may implement a general solution designed for any 3-sensor triangle in any orientation. However, by using only an equilateral or isoceles sensor triangle in a specific orientation, one can greatly simplify the triangulation process and use analytic geometry to eliminate the need for trigonometric functions.

Figure 14:
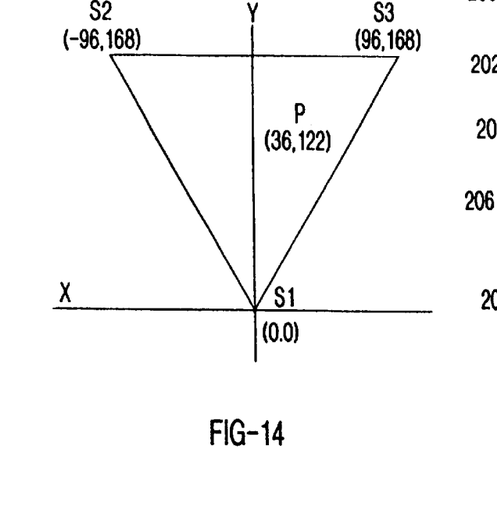
FIG. 14 illustrates an example sensor placement to perform triangulation according to the invention.

To begin discussion of the triangulation algorithm, one needs a clear picture of the geometry involved. One is dealing with a pyramid with a triangular base. The apex of the pyramid is the target. The base is an equilateral triangle, with a sensor at each of its three "corners". Each "edge" of the pyramid, sensor-to-apex, is a proximity distance. The sides' of the base, sensor-to-sensor, are equal (the side length S of the base triangle). FIG. 14 shows a base triangle in the preferred orientation The XY coordinates of each sensor are shown. In actual use the pyramid is inverted—the base is in the headliner and the apex is at the occupant's head. Here one preferably uses pixels instead of inches as units of measure to simplify drawing figures on a computer. The example of FIG. 14 has a side length of 198, chosen so that the height of the triangle (the Y-coordinates for S2 and S3 in this orientation) come out nearly even. The triangle height is actually:

$$H = S \cos(30) = 194.0 \cos(30) = 168.008928$$

FIG. 14 also shows a point P=(36,122). An arbitrary set of target coordinates has been selected for the apex of the pyramid at T=(36,122,200), and P is the projection of the apex onto the base plane. The height of point T (the Z-axis elevation) is set at 200 in this example. Given the target at T, the three sensor-to-target distances (the lengths of the "edges" of the pyramid) can be found via the Pythagorean:

$$r = \text{sqrt}(dx^2 + dy^2 + dz^2)$$

$$r1 = \text{sqrt}(36^2 + 122^2 + 200^2) = 237.02321$$

$$r2 = \text{sqrt}((36-(-96))^2 + (168-122)^2 + 200^2) = 244.55229$$

$$r3 = \text{sqrt}((96-36)^2 + (168-122)^2 + 200^2) = 214.09769$$

The triangulation problem is to find the these coordinates for T given three proximity distances (here named r1, r2, r3) obtained using the voltage-to-distance transformation discussed in the previous section. The only constant required is the side length S of the base triangle. In this particular orientation, we don't even need to make use of the sensor coordinates. For the special case of an equilateral sensor triangle oriented as in the example used here, the following solution applies:

$$X = (r2^2 - r3^2)/2S$$

$$Y = (2r1^2 + 2S^2 - r2^2 - r3^2)/2S\sqrt{3}$$

$$Z = \sqrt{(r1^2 - X^2 - Y^2)}$$

Substituting the data for the example:

$$S = 194, \ 2S = 388, \ S^2 = 37{,}636$$

$$r1^2 = (237.02321)^2 = 56{,}180.00$$

$$r2^2 = (244.55229)^2 = 59{,}805.82$$

$$r3^2 = (214.09769)^2 = 45{,}837.82$$

and performing the computation:

$$X = (59{,}805.82 - 45{,}837.82)/388 = 36.0$$

$$Y = ((2 \times 56{,}180) + (2 \times 37{,}636) - 59{,}805.82 - 45{,}837.82)/(388 \times 1.732) = 122.0$$

$$Z = \sqrt{(56{,}180 - X^2 - Y^2)} = 200.0$$

This gives results which match the coordinates we started with, T=(36,122,200). Beyond the basic math operators, this version of the algorithm requires only the square-root operator, and is much simpler (and faster) than the original trigonometric approach.

To review the computations involved:

Step 1—three sensor voltages are transformed to proximities using the function:

$$proximity = \log_e((volts - A)/B)/C$$

These are proximity radii, since each is the radius of a hemisphere about a sensor.

Step 2—the three radii and the spacing (side length) of the sensor triangle are used to compute the XYZ coordinates of the target using the three functions:

$$X = (r2^2 - r3^2)/2S$$

$$Y = (2r1^2 + 2S^2 - r2^2 - r3^2)/2S\sqrt{3}$$

$$Z = \sqrt{(r1^2 - X^2 - Y^2)}$$

Note that this method applies only to three sensors in an equilateral triangle with the orientation shown in FIG. 14. Notice also in FIG. 14 that once the XYZ coordinates are computed, the Y coordinate can be adjusted to relocate the origin of the coordinate system in the center of the sensor triangle, instead of at sensor 1, by simply adding a constant equal to 0.5S /cos(30).

The required math operators (in addition to add, subtract, multiply and divide) are only the natural log and the square root. The log transformation can be accomplished via a look-up table. Noise in the input signal is typically on the order of 5 to 10 mV for a +−5 volt system, and that resulting XYZ coordinates are accurate to about 1 millimeter, given this signal-to-noise value. It is preferred to maintain this level of accuracy if "micromotion" of an operator's head is being analyzed.

Using a variety of 486 CPUs and 30 to 100 kilosample digitizers (and averaging about 50 samples to reduce noise), one may obtain throughput of about 1 ms per coordinate computation—about 1000 position samples per second. Of course, when one attempts to store these values to disk or send them to another device via serial or parallel link, this throughput drops by about an order of magnitude. Available inexpensive controllers would perform much more slowly—most of them are 8-bit devices without advanced math operators. This has precipitated consideration of two strategies: (1) implementing the transform and triangulation functions in hardware, and (2) implementing an integer version (non-floating point math) of the algorithm incorporating a lookup table for the log transform.

The first function one may implement in hardware is:

$$proximity = \log_e((volts - A)/B)/C$$

(where typically A=4.0, B=−50.0, C=−0.5)

First, one can optimize the function for hardware implementation by replacing the divide operators with multipliers—by changing the B and C constants to their reciprocals. This keeps our representation of B at a reasonable voltage. At the same time, we can remove one negative sign by using (A−volts) and changing the sign of B:

$$proximity = \log_n((A - volts) \times B) \times C$$

(where A=4.0, B=0.02, C=−2.0)

One can simplify further by noting that log(A×B)=log(a)+log(B) and that B is a constant:

$$proximity = (\log_e(A - volts) + D) \times C$$

(where A=4.0, D=$\log_e$(B), C=−2.0)

But the available log amplifiers will be base 10, rather than base e, so one needs to add an additional multiplier to adjust for this ($\log_e = \log_{10} \times 2.3026$):

$$proximity = (\log_{10}(A - volts) + D) \times E$$

(now A=4.0, D=$\log_{10}$(B), E=C×2.3026)

Finally, we need to clamp the input to the log operation to a positive value: signal noise will often result in a negative result for (A−volts) when a near empty-field condition exists. The final 5 steps in the computation will be:

subtract - clamp - log - add - multiply

Since the last operation is a multiplier, one can modify the constant E to perform scaling of the result to any convenient range. Using scaling of 0.25 volt=1.0 inch keeps all intermediate terms and constants in the range +−5 volts. This computation can be performed using a log amplifier and a few operational amplifiers, optionally using a precision multiplier chip for additional accuracy and management of intermediate term magnitudes. One also needs stable reference voltages for A, D, and E and the clamp voltage of about 0.05. Obtaining the XYZ coordinates is a similar case. A circuit implementing this function (and the three functions for the XYZ algorithm) has been built and is currently being evaluated. The throughput obtainable is a function of the RC constants in a rather long series of op-amp stages, and can be prohibitive.

Further improvements to triangulation implementation are to convert part or all of the voltage/proximity transform function, and the triangulation algorithm, from software to hardware. This is accomplished using readily available electronic devices including operational amplifiers, log amplifiers, and precision multipliers. This can eliminate the need for a microprocessor—making the head XYZ coordinates available as analog signals to the vehicle's airbag controller, or to the sleep-detecting circuitry. Alternatively, an inexpensive controller can be used to digitize XYZ coordinates and report these via a serial link.

The capacitive coupling sensors installed in the vehicle roof detect the surface of the occupant's head. The triangulation algorithm computes the location of a point inside the head mass. This difference is reconciled by the transform function, which adds the average head radius (3.0" to 3.5") to the head proximity value.

Head XYZ coordinates are also used for detection of driver impairment based on head motion, as disclosed in PCT Application No. PCT/US96/14060, which discloses two examples of head position-time profiles for detection of an impaired operator condition: a nodding-off profile, and a lack of head motion profile.

A third profile of impairment is achieved by comparison of the frequency of head motion and frequency of vehicle roof motion, caused by vehicle vibration. Vehicle x and/or y-axis roof motion can be determined by two 90-degree offset micromachined accelerometers installed in the roof.

An operator's sleepy versus alert condition is distinguishable based on this frequency phase shift, because an alert human's balance mechanisms attempt to maintain a stationary head orientation relative to earth, thus compensating for vehicle x-y frequencies. Failure of the operator to compensate head position for vehicle x-y motion is an additional indicator of sleepiness. This method of sleepiness detection is also valuable for detecting the drowsiness of an operator whose head is against the seat headrest.

Head triangulation data may also be employed in vehicle operated by the handicapped. By moving one's head in a prescribed manner the person can activate and/or control various devices. Vehicle devices activated in this manner may include the various driving controls as well as turn signals, horn, cruise control, lights, and the like. The table below demonstrates eight distinguishable head motions in X and/or Y axes, which can be employed by a handicapped person to activate various devices in the vehicle.

| Indicator # | X   | Y   | Head Vector   |
|-------------|-----|-----|---------------|
| 1           | +   | +   | up and left   |
| 2           | −   | +   | down and left |
| 3           | +   | −   | up and right  |
| 4           | −   | −   | down and right|
| 5           | +   | ~0  | up            |
| 6           | −   | ~0  | down          |
| 7           | ~0  | +   | left          |
| 8           | ~0  | −   | right         |

Figure 7:
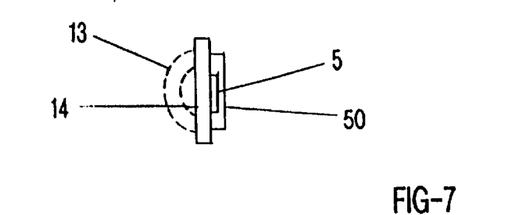
FIG. 7 is a schematic of an embodiment of the invention to activate the vehicle's horn by proximity switch.

For some applications, triangulation of the head is not required. In the example shown in FIG. 7, a control device (not shown) may utilize the capacitive sensor 5 inside or on a cover 14, so the sensing fields 13 extend outward from the control device 14. The person could activate the control by moving his hand a certain distance into the field, which is detectable due to causing a change in capacitive coupling between the electrodes of the sensor. One application of this device could be to activate the horn switch 50 located on the steering wheel of a vehicle.

The preferred capacitive sensor has been described in U.S. Pat. No. 5,602,734, and PCT Application No. PCT/US97/03510. Several variations of the basic form are further explained below.

The basic form of the sensor is employed in vehicles with a solid roof structure, which allows greater freedom in sensor design and placement, e.g., directly above the seats, and use of round electrodes which create hemispheric sensing fields sensitive to the occupant's head.

Figure 8:
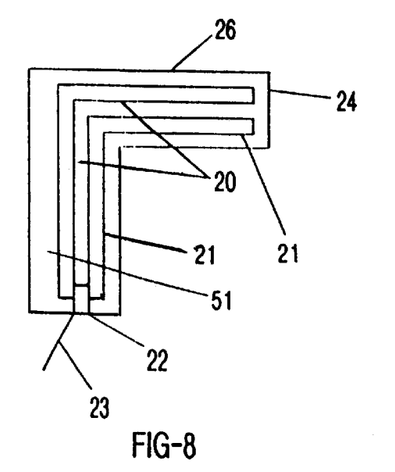
FIG. 8 is a schematic of an "L" shaped capacitive occupant sensor of the invention seen from the side facing the occupant.
Figure 9:
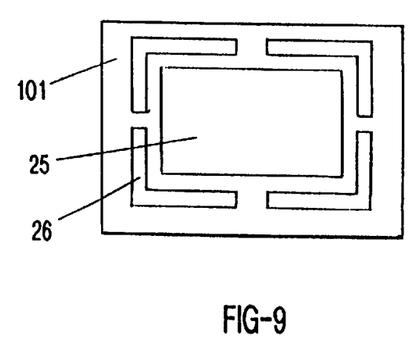
FIG. 9 is a schematic of "L" sensors of the invention configured around a sunroof, seen from the side facing the occupant.
Figure 10:
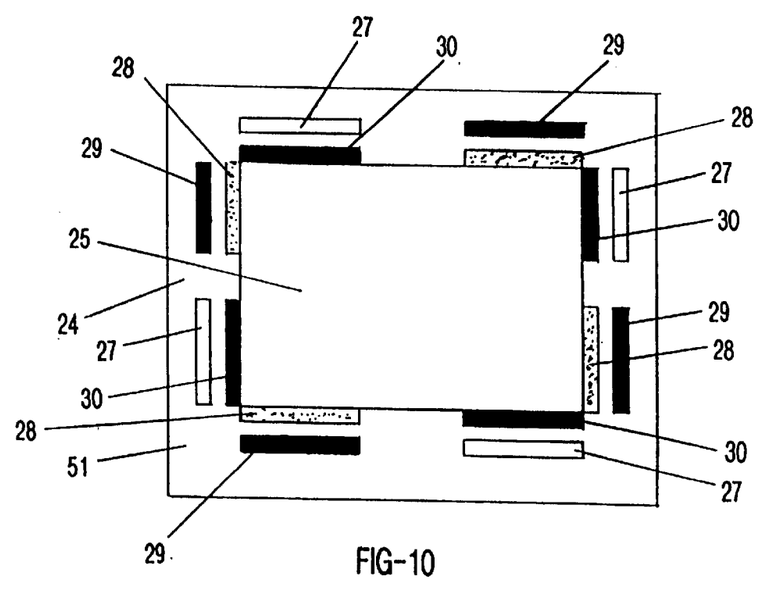
FIG. 10 is a schematic of an electrode arrangement of the invention using two frequencies and opposite positioning of drive versus receive electrodes.
Figure 11A:
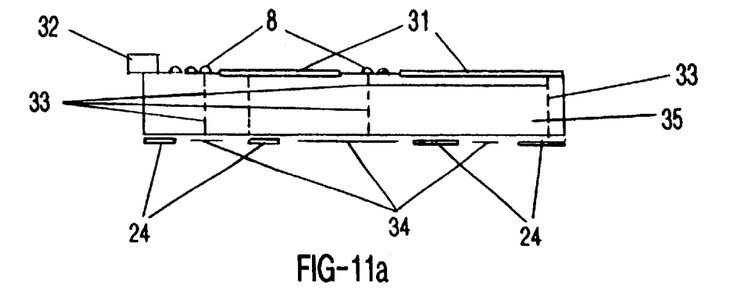
FIGS. 11(a)–(c) are cross-section, top, and bottom views of preferred electronics parts placement on a substrate side opposite from the adjacent electrodes.
Figure 11B:
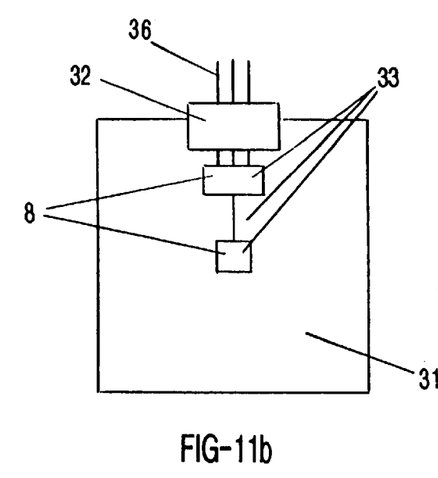
Figure 11C:
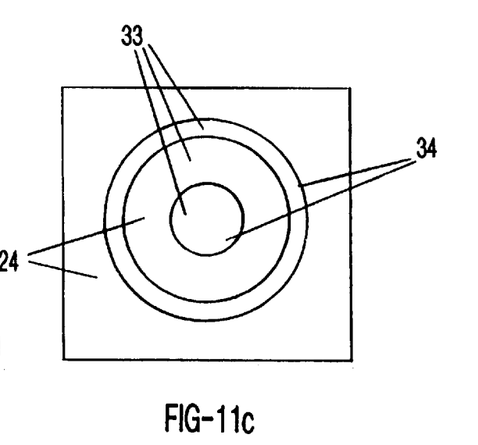
Figure 12:
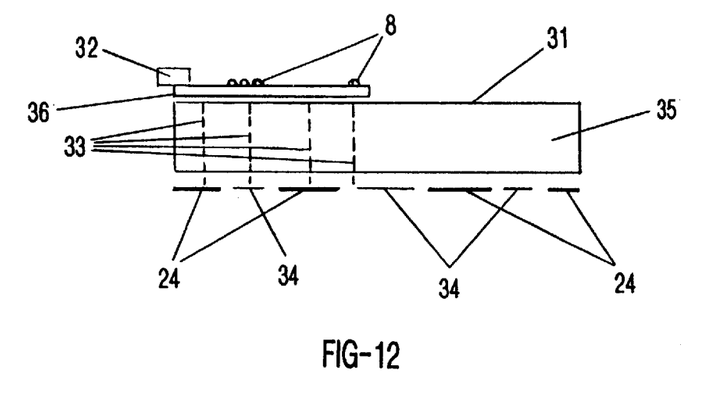
FIG. 12 is a cross-section view of placement of the electronic parts on a separate circuit board from the dielectric substrate supporting the electrodes.

One configuration of the sensor, employing "L" shaped electrodes is depicted in Fig. 8. In FIG. 9 a vehicle installation is shown using opposing pairs of the sensors positioned in the vehicle roof. The sensors of course will be covered by the vehicle headliner trim (not shown). Various other arrangements of the electrodes may be employed, including multiple drive frequencies, as shown in FIG. 10.

As shown in FIG. 8, the electrodes are formed on one surface of a dielectric substrate 51, with a grounded area 24 surrounding the electrodes and throughout the opposite surface (not shown) of the dielectric substrate 51. The grounded opposite side is connected to the grounded areas surrounding the electrodes, by plated through holes, edge folding, a crimped connector, staple or rivet, or other means (not shown).

The power, ground, and input/output lines 23 are fed to electronic parts (not shown) installed adjacent to the electrodes 20,21, either directly on the substrate 51, on a separate circuit board 22 adhered to the substrate 51, or on the opposite side of the substrate. In the latter case, connection to the electrodes may be accomplished with plated through holes or other means (not shown).

In a sunroof-equipped vehicle, the algorithm to determine position may use voltage threshold values and apply lookup tables, other logical means, or employ geometric relationships. The "L" shape capacitive sensor 26 can be installed at each corner of the sunroof, in a manner to provide overlapping sensing fields beneath the sunroof edge and open area 25, in which an occupant's head is located.

Alternatively, the electrodes may be positioned around the perimeter of the sunroof opening, and may be operated at various frequencies. An illustrative configuration is shown in FIG. 10, in which a set of drive electrodes 27 and receive electrodes 28 are operated at a first frequency, and a second set of drive electrodes 29 and receive electrodes 30 are operated at a second frequency.

The sensing system thus described may be used to modify airbag deployment characteristics based on occupant head position, or for various other applications disclosed in applicant's issued and pending patent applications.

To compensate for the effect caused by the position of the sunroof cover (i.e., slid to the rear providing open airflow, partially opened, or closed), the electronics or microprocessor supporting the L electrode capacitive sensors may maintain various reference values of sensor output. Upon startup, the reference function determines if the reference output value indicates a default closed position of the sunroof, or has changed in some magnitude to indicate any of the possible open sunroof positions. If the reference has changed, alternate lookup tables or modifications to head position algorithms are employed. This change in reference output may be rechecked each time the sunroof cover motor is activated, or may be continuously checked if the cover is manually operated.

In addition, a reference sensor can be employed to detect moisture on the plastic or glass covering over the sunroof opening, as this is known to have an effect on capacitive sensor response. Change in the reference sensor output is used to adjust the lookup tables, or modify the algorithm which determines occupant head position.

Figure 15:
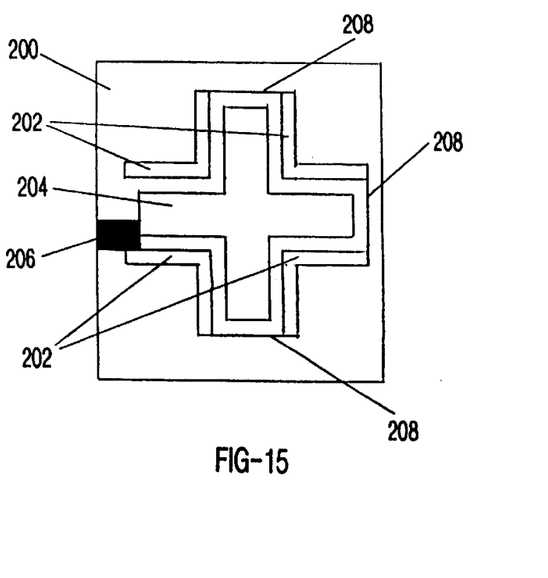
FIG. 15 is a schematic of an "+" shaped embodiment of the invention.

An alternative arrangement of electrodes is depicted in FIG. 15. In this embodiment of a capacitive sensor, the L-electrodes which are driven by an oscillator signal surround each leg of a "+" shaped electrode which receives the signal above ground plane 200 and near electronic parts 206. The advantage of this arrangement is to achieve increased sensing range attributable to the greater X-Y span of the receive electrode 204. While the drive and receive functions can be reversed, the design is simplified as shown because the four drive electrodes 202 can be connected by a circuit trace 208 positioned outside the end of each leg of the "+".

Applicant's pending U.S. patent application Ser. No. 08/778,871 demonstrates a sensor array constructed of a flexible dielectric substrate with integrated die-cut cable, electronic parts adjacent to the electrodes, and grounded areas surrounding the electrodes connected to the opposite side ground plane either with or without penetrating the substrate.

An adjacent electrode capacitive sensor constructed as shown in FIGS. 11(a)–(c) and 12 will achieve substantially the same results as the above-claimed sensor construction. In these embodiments, the electronic parts 8 are installed either directly on the back side of the dielectric substrate 35, or on a "daughter" board 36 which is adhered to the back side. Rather than a die-cut integrated cable, a standard connector 32 is employed to connect power, ground, and input/output (I/O) 36 which are provided by a conventional cable (not shown). In both configurations of this preferred embodiment, the grounded area 24 surrounding the electrodes 34 is connected to the grounded backplane 31 with plated through holes 33. Optionally, an external ground connection can be employed as disclosed in the pending U.S. application.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A device for determining head position of a vehicle occupant by reference to proximity values obtained from an array of three or more proximity sensors, said device employing a geometric relationship of the sensors and the occupant's head, wherein said device employs an adjustment of the proximity values to adjust for a difference between a head surface proximity and a head interior point.

2. The device of claim 1 wherein said device is employed for a task selected from the group consisting of detecting occupant impairment, detecting relative risk to the occupant caused by occupant's possibly dangerous position, and enabling the occupant to perform tasks by undertaking predetermined movements of the head.

3. A device for detecting vehicle operator impairment, said device comprising one or more capacitive sensors sensing operator head motion, one or more vehicle motion sensors, and computation means for determining phase shift relationship between those of vehicle motion and operator head motion in order to ascertain whether operator head motion is compensating for vehicle motions.

4. The device of claim 3 wherein said computation means comprises means for determining whether operator head motion deviates substantially from being perfectly out of phase with vehicle motion.

5. A vehicle occupant sensing system comprising one or more capacitive sensors and one or more weight sensors, said one or more capacitive sensors comprising dual adjacent electrodes formed on a surface of a dielectric substrate, and wherein information from both capacitive sensors and weight sensors is utilized by said system.

6. The system of claim 5 wherein said capacitive sensors are positioned in a vehicle location selected from the group consisting of roof, dashboard, and seat.

7. The system of claim 5 wherein said weight sensor is positioned in a seat.

8. A vehicle airbag system comprising an occupant sensing system and an airbag inflation means, said occupant sensing system comprising one or more capacitive sensors positioned adjacent a roof and means for detecting occupant weight, wherein said airbag inflation means become armed upon said capacitive sensors outputting a signal indicating presence of an occupant and receiving a signal from said weight sensing means indicating presence of an occupant.

9. A capacitive sensor comprising a plurality of electrodes formed on a single surface of a dielectric substrate, said electrodes being separated by grounded areas, said substrate additionally comprising a grounded area on an opposite surface from the electrodes, said opposite-side grounded area electrically connected to grounded areas which separate said electrodes, and wherein said substrate encompasses all or a portion of at least two adjacent sides of a rectangle.

10. The capacitive sensor of claim 9 wherein said rectangle sides are defined by a vehicle sunroof.

* * * * *